Figures 1, 2:
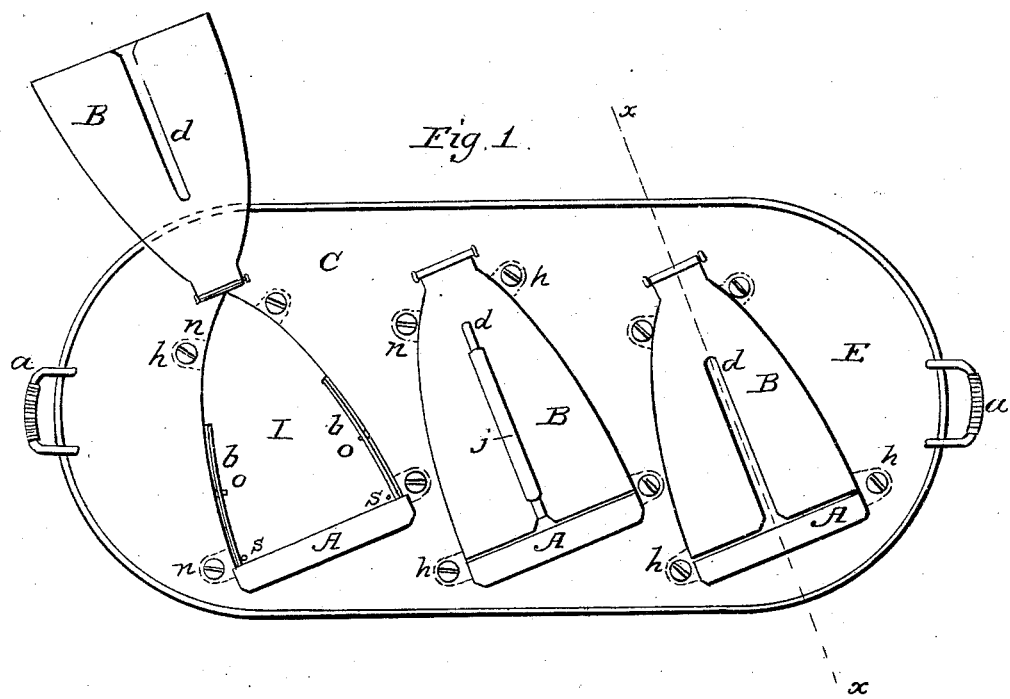

H. W. BLEYER.
Sad Iron Heater.

No. 44,701.  Patented Oct. 18, 1864.

Witnesses:  Inventor:

UNITED STATES PATENT OFFICE.

HENRY W. BLEYER, OF BUFFALO, NEW YORK.

IMPROVED SAD-IRON HEATER.

Specification forming part of Letters Patent No. 44,701, dated October 18, 1864.

*To all whom it may concern:*

Be it known that I, HENRY W. BLEYER, of Buffalo, in the county of Erie and State of New York, have invented new and useful Improvements in Sad-Iron Heaters; and I do hereby declare that the following is a full, clear, and exact description thereof, which will enable others skilled in the art to make and use the same, reference being had to the accompanying drawings, forming a part of this specification, in which—

Figure 1 is a plan of my improved heater, and Fig. 2 a section thereof in the line $x$ in Fig. 1.

Similar letters of reference indicate like parts.

My improved sad-iron heater possesses several advantages of construction and operation, some of which are hereinafter mentioned.

It consists, in part, of one or more recesses or pits, I, made in the surface of a stove-plate or a griddle or pan, E. If they are made in the surface of a movable pan like the one here shown at E, it should have handles $a$ at its ends. The surface or bottom of the pan or plate is to have openings of the proper shape cut therein to receive dishes K, which are secured therein by means of flanges or ears $n$, which a e secured to the plate or pan E by screws $h$. The advantage of this mode of constructing the pits I is that they can be replaced by new ones when any of them wear out or become otherwise unfit for service.

Each pit has a cover, B, hinged to the plate or pan at its narrow end. This cover is slotted at its free end by a longitudinal slot, $d$, to receive the handle $j$ of the sad-iron when the latter is being heated.

A are "openers" constructed by bending a piece of sheet metal so that a portion shall extend vertically down into the pit I along its front and another portion shall reach over its front edge at an angle of about forty-five degrees, more or less, above the plane of the plate E. The opener has also arms $b$, extending from its ends, which arms extend close along the sides of the pit and rest upon pins O, projecting outward from the sides of the pit. Pins S project upward above the surface of the pits I at the corners adjacent to their straight sides for the purpose of retaining the vertical part of the opener in its position.

The operation is as follows: The plate or pan being ready for use, the toe of the sad-iron is allowed to rest upon the angular projection of the opener A, whereby it is brought down upon the surface of the pan and its arms $b$ are raised against the cover B, which is thereby thrown up sufficiently to permit the toe of the sad-iron to be introduced under it, when it (the iron) is slipped into the pit I, the cover B immediately resuming its place, receiving the handle of the iron in its slot $d$.

This mode of constructing and operating the heater, it will be seen, also saves the ironer from using any special means for raising the cover of the pit.

What I claim as new, and desire to secure by Letters Patent, is as follows:

1. In sad-iron heaters, constructing the pits or receptacles I for the iron by attaching removable dishes K to the plate or pan of the heater, so that the pits can be removed, substantially as above described.

2. The cover openers A, constructed and operated substantially as above described.

3. The combination of the pits I, the openers A, and the slotted covers B, substantially as above described and shown.

HENRY W. BLEYER.

Witnesses:
 ALBERT BLEYER,
 WM. GROSHAUS.